United States Patent Office 3,654,366
Patented Apr. 4, 1972

3,654,366
PREPARATION OF 3,6-DIAMINOPSEUDOCUMENE
Joseph Green, London, and Stanley G. Brooks, Epsom Downs, England, assignors to Vitamins Limited, London, England
No Drawing. Filed July 17, 1968, Ser. No. 745,367
Claims priority, application Great Britain, Aug. 2, 1967, 35,546/67; Apr. 18, 1968, 18,296/68
Int. Cl. C07c 85/00, 85/10
U.S. Cl. 260—580      7 Claims

ABSTRACT OF THE DISCLOSURE 3,6-diaminopseudocumene and acid addition salts thereof are prepared by suspending 3,6-dinitro-5-halogenopseudocumene in an aqueous medium and thereafter reacting it with hydrogen in the presence of a hydrogenation catalyst. 2,3,5-trimethylquinol is also produced from pseudocumene by producing 3,6-diaminopseudocumene as an intermediate according to the above process and oxidizing and reducing it to produce the desired 2,3,5-trimethylquinol.

---

This invention relates to the production of 3,6-diaminopseudocumene. The invention also relates to the manufacture of 2,3,5-trimethylquinol, an intermediate in the manufacture of α-tocopherol.

It has been suggested to obtain 2,3,5-trimethylquinol (IV) using 1,2,4-trimethylbenzene (pseudocumene) (I) as a starting material in accordance with the following reaction scheme.

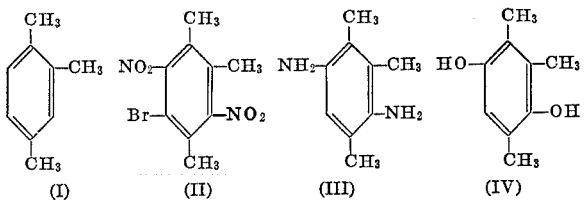

According to this reaction scheme 1,2,4-trimethylbenzene (I) is first converted by known steps to 5-bromo-3,6-dinitropseudocumene (II). This is then converted by a reduction process to 3,6-diaminopseudocumene (III), which can be converted to the required 2,3,5-trimethylquinol (IV) by oxidation and reduction.

Hitherto, the most difficult part of the above synthesis has been the catalytic reduction of the dinitrohalogeno compound (II) to (III) in good yield. This is because it is difficult to eliminate the halogen atom in compound (II) by hydrogenolysis except by using conditions of high temperature and pressure or prohibitively large quantities of noble metal catalysts. Thus Svishchuk, Grimbere, Basalkevich and Overchuk (Ukr. Khim. Shur. 1963, 29, 411) describe the reduction of (II) in 65% yield, using a Raney nickel catalyst at 145° C. and 600 p.s.i. Normal reduction procedures using noble metal catalysts in organic solvents require prohibitively large quantities of catalysts and give only poor yields (c. 30%) of compound (III) (c.f. Cheng Kuo Hui, J. Vitaminol., 1954, 1.8).

We have now found that the hydrogenolysis of 3,6-dinitro-5-bromopseudocumene can be carried out under less severe conditions and in greater yield by using a different reaction medium.

Accordingly the present invention provides a process for the preparation of 3,6-diaminopseudocumene and acid addition salts thereof which comprises suspending 3,6-dinitro-5-halogenopseudocumene in an aqueous medium and reacting it with hydrogen in the presence of a hydrogenation catalyst.

By an aqueous medium we mean a medium in which at least 50% by weight is water.

By halogeno as used herein and in the accompanying claims we mean chloro or bromo. Conveniently the bromo derivative is used.

Preferably the aqueous medium is of about neutral or of acid pH. Acid is generated as the reaction proceeds by the reaction of the hydrogen with the halogen. Thus in one preferred embodiment of the invention in which water is used as the initial reaction medium the pH is initially around neutral and becomes acid as the reaction proceeds. Under acid conditions the immediate product is normally in the form of an acid addition salt which may be converted into the free base by adjusting the pH. The immediate product is appreciably soluble in the reaction medium.

It is a surprising feature of the present invention that the reaction proceeds when the starting material is highly insoluble in the aqueous reaction medium. Hitherto organic solvents have been used and these have resulted in very poor yields. An important advantage of the present invention is that high yields are obtained.

As stated above, acid is generated during the course of the reaction. If desired a mineral acid may be present in the initial medium but this is not essential.

A preferred hydrogenation catalyst is palladium which may be suspended on charcoal.

One of the advantages and a surprising feature of the present invention is that the reaction may be performed under very mild conditions. Thus the reaction is conveniently performed at less than 10 atmospheres pressure and in the temperature range 50°C.–100° C.

According to a further aspect of the present invention we provide a process for the manufacture of 2,3,5-trimethylquinol from pseudocumene which incorporates the process of the present invention as a stage.

2,3,5-trimethylquinol is an intermediate in the manufacture of α-tocopherol. Accordingly the present invention also provides a process for the manufacture of α-tocopherol which comprises preparing 2,3,5-trimethylquinol by a reaction according to present invention and reacting the 2,3,5-trimethylquinol so formed with isophytol, phytol or a phytol halide.

Examples of the invention will now be given:

EXAMPLE 1

5-bromo-3,6-dinitropseudocumene (1 kg.) is suspended in water (1.5.1.) and 150 g. of a 10% palladium on charcoal catalyst added. The suspension is shaken in an atmosphere of hydrogen at 45 p.s.i. at a temperature of 70° C. until uptake of hydrogen ceases (9–10 hours). After cooling the catalyst is filtered off and washed with hydrochloric acid (250 ml.) and water (250 ml.). The washings and filtrate are evaporated to dryness under reduced pressure to give the 3,6-diamino-pseudocumene salt which on neutralisation with caustic soda gives the free base M.P. about 76°, in substantially quantitative yield. On oxidation with ferric sulphate, followed by reduction with sodium dithionite, according to known methods, pure 2,3,5-trimethylquinol, M.P. 173–4° C. is obtained, in 93% overall yield from 5-bromo-3,6-dinitropseudocumene.

EXAMPLE 2

5-bromo-3,6-dinitropseudocumene (1 kg.) is suspended in a solution of hydrochloric acid (1.5.1.) in water (1.5.1.) and 150 g. of a 10% palladium on charcoal catalyst added. The suspension is shaken in an atmosphere of hydrogen at 45 p.s.i. at a temperature of 70° C. until uptake of hydrogen ceases (9–10 hours). After cooling the catalyst is filtered off and washed with dilute hydrochloric acid (250 ml.) and water (250 ml.). The washings and filtrate are evaporated to dryness under reduced pressure to give the 3,6-diaminopseudocumene salt which on neutralisation with caustic soda gives the free base M.P. about 76°, in substantially quantitative yield. On oxidation with ferric sulphate, followed by reduction with sodium dithionite, according to known methods, pure 2,3,5-trimethylquinol, M.P. 173–4° C. is obtained, in 93% overall yield from 5-bromo-3,6-dinitropseudocumene.

I claim:

1. A process for the preparation of 3,6-diaminopseudocumene and acid addition salts thereof which comprises suspending 3,6-dinitro-5-bromo- or chloropseudocumene in an aqueous medium and reacting the suspension with hydrogen in the presence of palladium as hydrogenation catalyst at a temperature between 50° C. and 100° C. at a pressure less than 100 atmospheres.

2. A process as claimed in claim 1 in which the starting material is 5-bromo-3,6-dinitropseudocumene.

3. A process as claimed in claim 1 in which the pH of the aqueous medium is about neutral or acid.

4. A process as claimed in claim 1 in which the aqueous medium is initially water.

5. A process as claimed in claim 1 in which a mineral acid is present initially.

6. A process as claimed in claim 1 wherein the pressure is less than 10 atmospheres.

7. A process for the production of 3,6-diaminopseudocumene which comprises suspending 5-bromo-3,6-dinitropseudocumene in water, reacting the suspension at 50° to 100° C. at a pressure less than 100 atmospheres with hydrogen in the presence of a 10% palladium on charcoal catalyst.

References Cited

UNITED STATES PATENTS 3,154,584    10/1964    Gardner et al. _____ 260—580

OTHER REFERENCES

Svishchuk et al., Ukr. Khim. Shur., 29 (1963), p. 411.

JOSEPH REBOLD, Primary Examiner

R. L. RAYMOND, Assistant Examiner

U.S. Cl. X.R.

260—345.5, 578, 621 M, 646